SWITCHING SYSTEM

Filed Feb. 5, 1965 10 Sheets-Sheet 1

INVENTORS J. M. CATTERALL
E. D. MASUCCI
BY *William F. Simpson*
ATTORNEY

SWITCHING SYSTEM

Filed Feb. 5, 1965 10 Sheets-Sheet 2

June 18, 1968 J. M. CATTERALL ETAL 3,389,227

SWITCHING SYSTEM

Filed Feb. 5, 1965 10 Sheets-Sheet 3

June 18, 1968 J. M. CATTERALL ETAL 3,389,227

SWITCHING SYSTEM

Filed Feb. 5, 1965 10 Sheets-Sheet 4

SWITCHING SYSTEM

Filed Feb. 5, 1965

10 Sheets-Sheet 5

June 18, 1968 J. M. CATTERALL ET AL 3,389,227

SWITCHING SYSTEM

Filed Feb. 5, 1965 10 Sheets-Sheet 10

3,389,227
Patented June 18, 1968

3,389,227

SWITCHING SYSTEM

John M. Catterall and Eugene D. Masucci, Columbus, Ohio, assignors to Bell Telephone Laboratories, Incorporated, New York, N.Y., a corporation of New York Filed Feb. 5, 1965, Ser. No. 430,566
16 Claims. (Cl. 179—18)

This invention relates to automatic switching systems and particularly to providing multilevel preference or precedence and multilevel pre-emption of communication paths in such switching systems.

Previously transmission paths in an automatic switching system have been provided with two levels of preference and one level of pre-emption.

It is an object of our invention to provide a large number of levels of preference of precedence and a large number of levels of pre-emption.

In a prior system including preference and pre-emption, a regular or normal trunk appearance and a second or auxiliary trunk appearance are provided for each of the outgoing trunk circuits. The system is further arranged so that the marker will hunt over the regular trunk appearances first and if any is found idle the call will be established to this trunk appearance. The trunk is then marked with the preference of the call. However, if all of the trunks appear busy when searched over the regular trunk appearance, the marker then hunts over the auxiliary trunk appearances. If any auxiliary trunk appearance is found in which a corresponding trunk is not engaged in the transmission of a preference call, it will be pre-empted, i.e., seized and the connection previously established over such trunk or transmission circuit interrupted and the new call having a higher precedence or preference level established over this facility.

If one attempts to extend such an arrangement and provide an additional trunk appearance for each level of preference or precedence, two difficulties are encountered. In the first place, the number of trunk link frames must be greatly expanded because a small number of trunks require the entire frame capacity. In the second place, if the marker is made to hunt over each of the various auxiliary appearances of the trunk in order of their preference, the marker holding time is greatly extended. Such an arrangement, therefore, is uneconomical both because it requires a very large number of trunk link appearances per trunk and because it greatly extends the marker holding time.

It is an object of our invention to provide a large plurality of preference levels and levels of pre-emption for transmission paths in a switching system from a single appearance of such a trunk or transmission path on the trunk link frame.

A further object of our invention is to provide a multilevel preference or precedence arrangement together with a multilevel pre-emption arrangement in which the marker needs to search for a trunk of the group only once.

A feature of our invention is to provide equipment for recording in each individual trunk the preference level of the call in progress, i.e., the call being transmitted thereover.

Another feature of our invention is to provide a status circuit for each marker which may be controlled by storage equipment individual to each of the trunks of the selected group of trunks which determines the lowest preference level of the call in progress over such trunk or transmission facility.

Another feature of our invention is to provide a preference circuit which will condition the trunk link frames having trunks of a selected trunk group located thereon having calls of a predetermined preference level for selection.

Another object of our invention is to provide a status circuit controlled by the trunks of a selected group of trunks which status circuit is arranged to condition for selection the individual trunk circuits of the group having calls of a given preference level (i.e., usually the lowest) in progress.

In accordance with an aspect of our invention the marker first determines the lowest preference level of calls over circuits of a group of circuits available for transmission. Thereafter the marker compares the preference level of the incoming call with the lowest preference level of calls over the circuits available for transmitting the call. If the incoming call is of the same or lower preference level than the lowest preference level of calls in progress over circuits in the desired or selected trunk group, then busy tone is returned to the called subscriber.

If, however, the preference level of the incoming call is above the lowest preference level of calls in progress over the circuits available for the transmission of calls or messages, then the marker will advance and select one of the trunks having a call of the lowest preference level in progress for transmitting the incoming call.

After the marker has determined that a trunk or transmission circuit having a call or lower precedent than the instant call is available, then the marker will search through the trunk link frames and select a trunk link frame having such a trunk having a call in progress of the required preference. After this a trunk on the selected frame is selected, the call is set up, and the marker is dismissed, after which the marker is available for another call.

A feature of our invention, therefore, relates to distributing the calls of a trunk group over a plurality of trunk link frames and at the same time indicating the preference level of the calls in progress over respective trunks and directing a marker to a trunk link frame having the trunk appearance of such a trunk having a lower preference level call than the preference level of the incoming call.

A feature of our invention relates to marking all trunks having calls of a lower preference in progress than indicated by the status circuit.

Another feature of our invention relates to checking circuits which indicate to the marker whether the selected or pre-empted trunk had a call of the indicated preference level in progress thereover.

In accordance with an exemplary embodiment of our invention, the marker stores in the individual trunk circuits the preference level of the call to be transmitted thereover at the time that the marker selects and sets up the call to or over the trunk. The preference levels thus recorded in the individual trunks are employed to control the status circuit which indicates the lowest level preference of calls over trunk circuits available for use on a succeeding call. The idle condition of the trunks is the first or lowest level indication. If any trunks are idle, they will be used first and the preference level of the call stored in the trunk. When none of the circuits are idle, then the status circuit indicates the preference level of the lowest preference call in progress over the various circuits of the group.

The status circuit also conditions all of the individual trunk circuits having calls of this lowest preference level so that they may be selected by the marker if the marker has a call having a higher preference level.

In accordance with the exemplary embodiment of our invention described herein the marker in attempting to find a trunk for a succeeding call, first checks the status circuit. If the status circuit indicates that one or more trunks are idle, then the marker will select one of these trunks and establish the call and store the preference level of the call within this trunk. If none of the trunks are idle, this will be indicated by the status circuit which will indicate to the marker the lowest level preference call in progress over the various trunks of the group. If the new call is of equal or lower preference than the lowest call in progress over the group of trunks, then the marker will either route advance or return a busy signal to the calling subscriber.

If the new call is of a higher preference than the lowest preference call in the group of trunks, then the marker will select one of the trunks having such lower preference calls in progress. The marker will select this trunk in the same manner that it selects idle trunks of the group because the status circuit has conditioned all of the trunks having this lowest preference level of calls in progress thereover for the marker to select one of such trunks. The marker then selects an idle or a thus conditioned trunk first by selecting a trunk link frame having such a trunk thereon and then selects an available trunk in a manner similar to that described in an article entitled "Trunk Selection by No. 5 Crossbar Markers" by E. L. Erwin and published in the Bell Laboratories Record for August 1950 beginning on page 357. Thereafter the marker will interrupt the call in progress and establish a new call.

Another feature of our invention relates to a checking circuit which is employed to determine if the status of the calls as indicated in the status circuit changes during the time a trunk is being selected.

Another feature of our invention relates to various check circuits to insure the proper operation of the system.

The foregoing objects and features of this invention may be more readily understood from the following description of an exemplary embodiment thereof when read with reference to the attached drawing, in which.

(I) GENERAL DESCRIPTION

Figure 1:
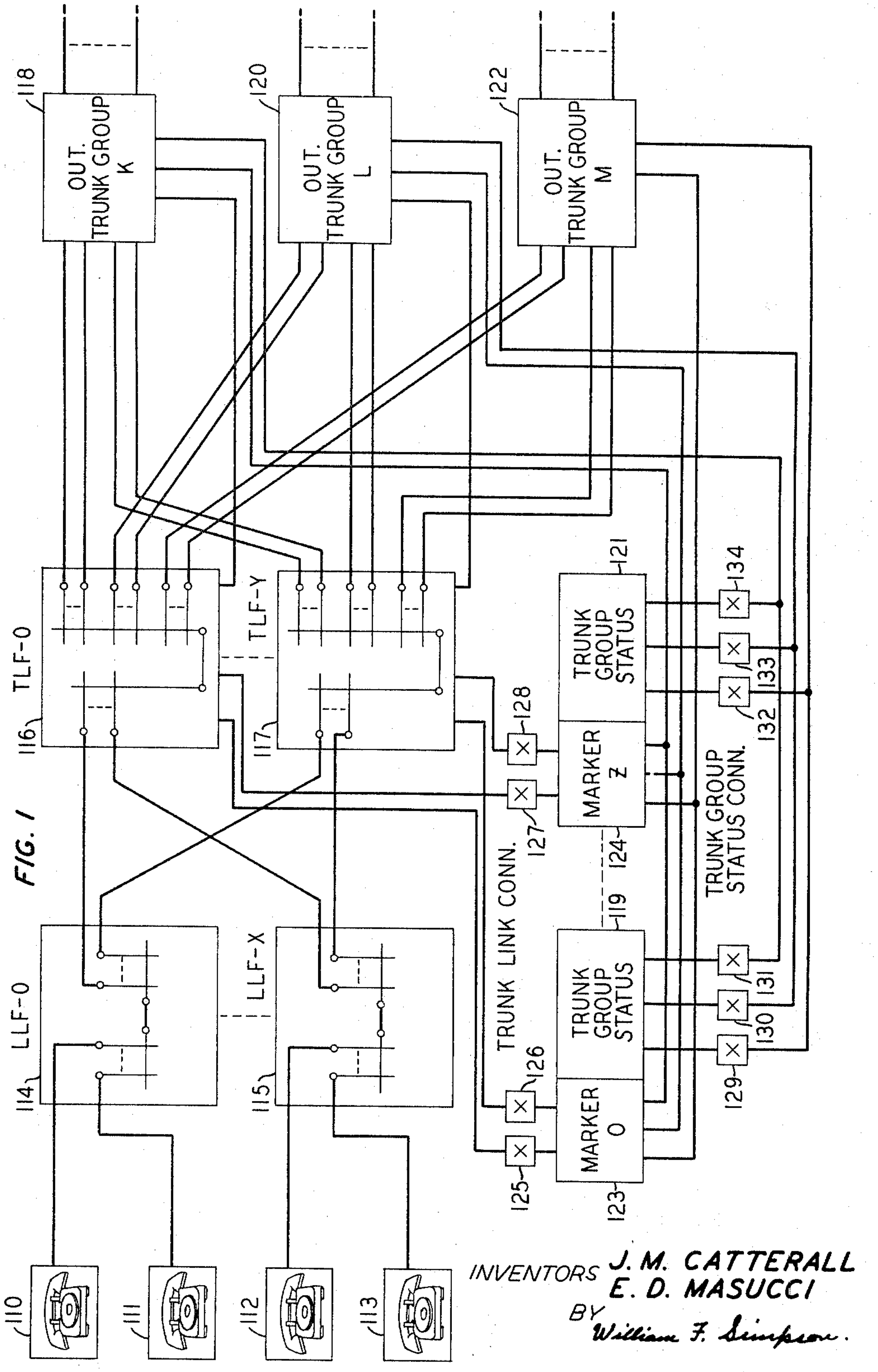
FIG. 1 shows an outline of the elements of our invention and the manner in which they cooperate with a typical switching system.

FIG. 1 shows a portion of a suitable crossbar switching system of a type with which an exemplary embodiment of our invention is arranged to cooperate. Such a crossbar switching system is described in greater detail in U.S. Patent 2,585,904 granted Feb. 19, 1952 to A. J. Busch. Only certain portions of such a switching system are represented in FIG. 1. The other portions including the portions described in the above-identified Busch patent are also included in the switching system and operate in their usual manner as described in that patent.

As shown in FIG. 1 such a switching system includes a plurality of line link frames 114, 115 to which subscriber lines are connected and which lines in turn extend to the subscriber stations such as 110, 111, 112 and 113. While only individual subscriber lines and stations are shown, other types may be connected with the line link frames including multiparty lines and PBX trunks and lines as is well understood. Certain trunks may also have a line link appearance, i.e., be connected to these frames.

As shown in FIG. 1 each line link frame includes a plurality of primary and secondary line switches. These line link frames are in turn interconnected with trunk link frames 116, 117, etc. in the usual manner.

As shown in FIG. 1 a plurality of groups of trunks 118, 120 and 122 are interconnected with the trunk link frames 116, 117, etc. Moreover, trunks from the respective trunk groups are interconnected with or spread over different ones of the line link frames in order to increase the efficiency of the trunk group and also the efficiency of the switching system and the trunk link frames. Each of the trunk groups 118, 120 and 122 extends to a different switching station or destination in the usual manner. Each of these trunk groups may comprise a small or large number of individual trunks each of which may carry a communication path or call. As shown in FIG. 1 only one-way trunks extending from the trunk link frames to distant destinations are represented. However, two-way trunks which may be used in establishing calls from the switching system of FIG. 1 or to the switching system of FIG. 1 may be employed and such trunks operate in the usual manner. The respective trunk groups may comprise all trunks of either kind, that is, one-way trunks or two-way trunks, or the trunk group may comprise some one-way trunks and some two-way trunks.

Marker circuits, such as 123 or 124, are employed to establish a call from one of the subscriber stations such as 111 through the line link frame and trunk link frame to one of the trunk groups. These marker circuits are interconnected with the trunk link frame by means of the trunk link connectors 125, 126, 127 and 128. The markers are also interconnected by similar line link frame connectors with the line link frames. These connectors are not represented in FIG. 1 but are provided and operate in the manner described in the above Busch patent.

As will be described herein in setting up a connection from a subscriber's station such as 111 through the line link frame 114 and the trunk link frame 116 to one of the trunk groups 118, the marker such as 123 will record in the trunk employed the preference level of the call set up.

In the exemplary embodiment of our invention described herein provision has been made to distinguish between five different levels or grades of preferance for the various calls established through the switching system. The preference level of call is determined in the first instance by signals transmitted by the calling subscriber, as, for example, in the manner described in Gorgas et al. Patent 3,150,236, Sept. 22, 1964.

A trunk group status circuit such as 119 and 121 is included in or is individual to each marker. The trunk group status circuit is interconnected with the individual trunks of the different trunk groups by the trunk group status connectors 129, 130, 131, 132, 133 and 134 and is controlled by the status of the calls in progress through the respective trunks of the groups. The status circuit 119 is also employed to condition the trunks of the connected group having the lowest status calls so that they may be selected by a marker in setting up a call. The status circuit 119 also is employed to determine the lowest preference calls in progress through the interconnected trunk group.

In the exemplary embodiment of our invention described herein the lowest preference group is designated No. 4, the next lowest preference group of calls designated No. 3 and then No. 2 and No. 1, the highest preference calls being designated No. 0 calls.

So long as all of the trunks of the group are not busy, then the No. 4 level is the level of preference designated by the trunk group status circuit and calls of all different levels of preference are transmitted or set up to the idle ones of the trunks of this group. When all of the trunks become busy then the status circuit will indicate the lowest preference of the call or calls in progress over the trunk group and will condition trunks carrying such calls for seizure by the marker should another call be directed to this trunk group.

The marker in attempting to set up other calls to the trunk group will cause the trunk group status connectors such as 129, 130 or 131 to operate to connect the trunks of the trunk group to status circuit 119, for example, of or individual to the marker 123. The marker will then determine whether the new or incoming call is of the same, a higher or a lower preference level than the lowest level of preference calls then in progress over the trunks of trunk group 118, for example. If the new call is of a higher preference than the lowest preference call in the trunk group, the marker will then hunt over the trunks of the trunk group having this lower preference and selected one of such trunks after which the call of lower preference is interrupted and the call of higher preference established over the selected trunk.

Thus, only one trunk appearance for each trunk is required in the trunk link frames and the marker is required to hunt over only the trunks in the trunk group which are rendered available for selection by the trunk group status circuit, thereby conserving the marker and holding time on the calls.

(II) DETAILED DESCRIPTION

In the following detailled description only those circuits and parts of circuits depicted in FIG. 1 and specifically involved in the functioning of the preference level operation in accordance with our invention are described in deail. Other circuits depicted in FIG. 1 and well known in the art for the general operation of switching systems are not discussed except insofar as necessary for an understanding of the present invention. Further, various elements of the disclosed circuits, such as of the marker, are assumed to operate in their normal and known fashions. Accordingly, reference will be made in a few instances to the operation of relays in such circuits, which relays and their operating paths are not shown but are assumed to operate in their known or obvious manners.

In the description each relay is designated by a combined numerical and alphabetical reference, wherein the numerical prefix indicates the figure number on which the relay coil may be found. Contacts of the relay are given the same designation but the individual contacts are indicated by a numerical suffix following a dash; where needed for ease in following the description, the figure on which the relay contacts appear will be specifically noted. Certain relay contacts are designated without a relay prefix number; these are contacts of relays of various circuits, which relays are not shown on the drawing but which operate in known fashion. Further, to simplify the description in a few instances relay contacts not involved in the operation of our invention have been omitted from certain of the control paths.

(1) *Storage of preference level in trunk*

Figure 2:
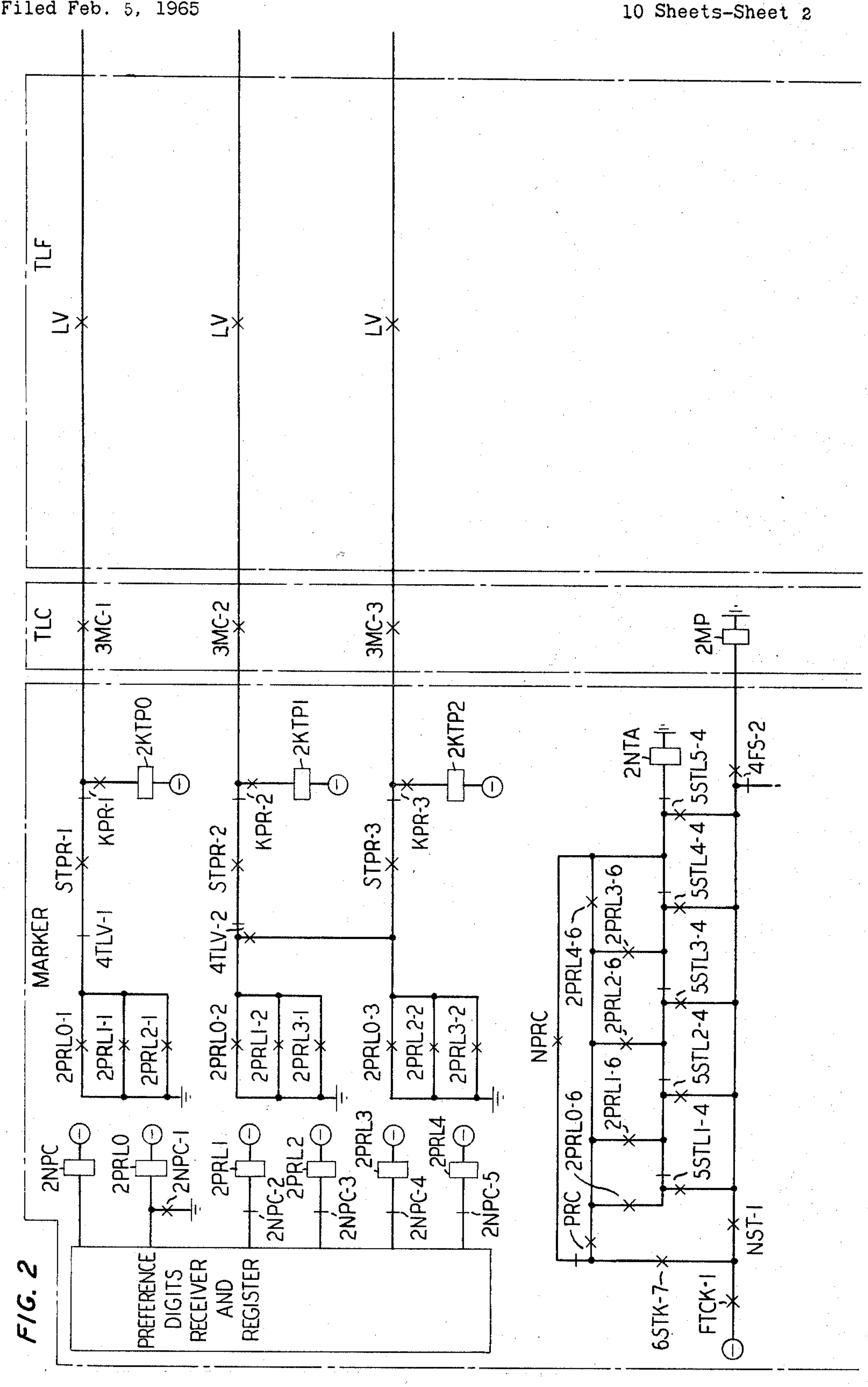
FIGS. 2 and 7 show the manner in which the preference of a call is stored in a trunk and a preference level comparing circuit.
Figure 7:
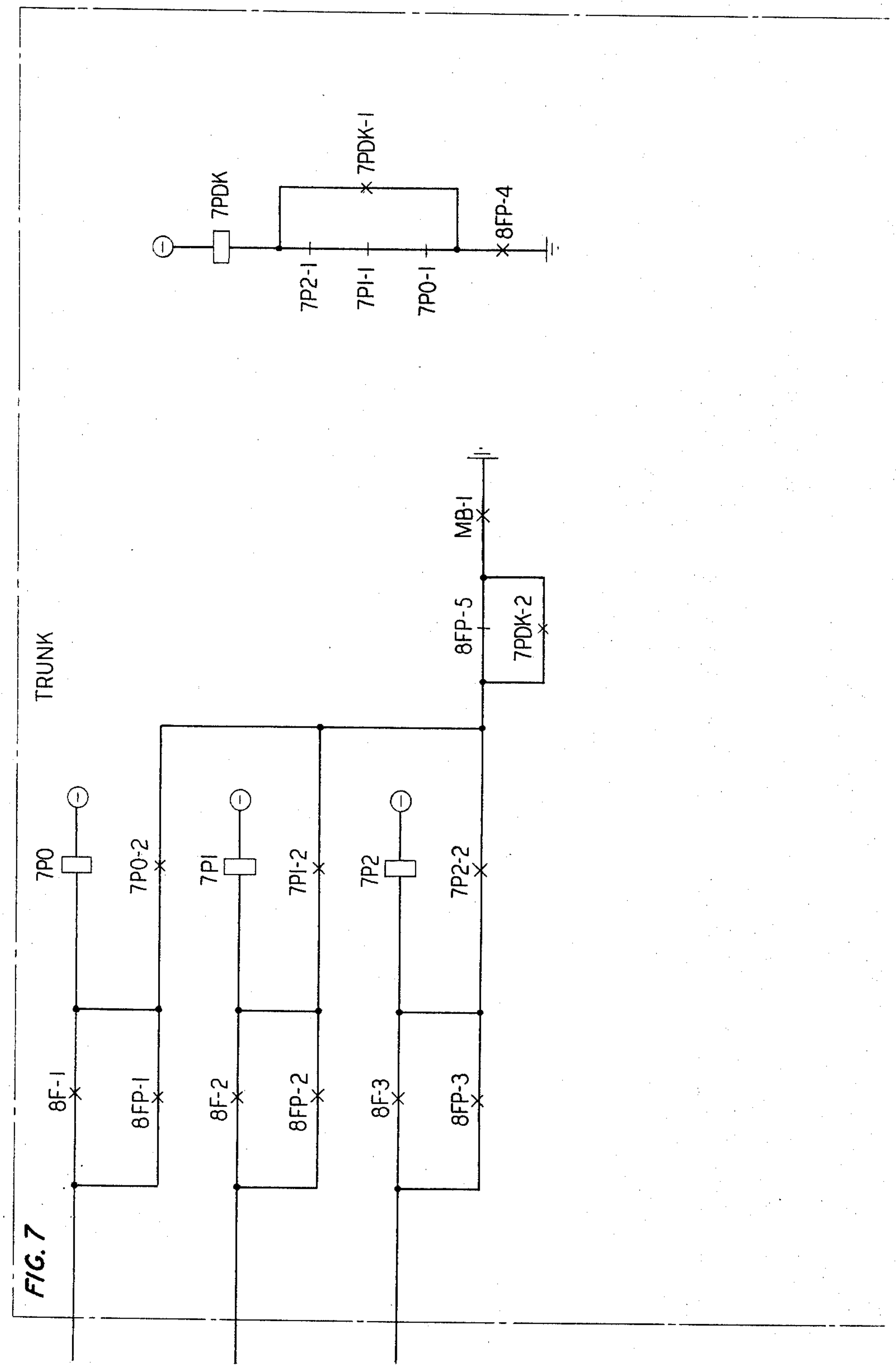
Figure 8:
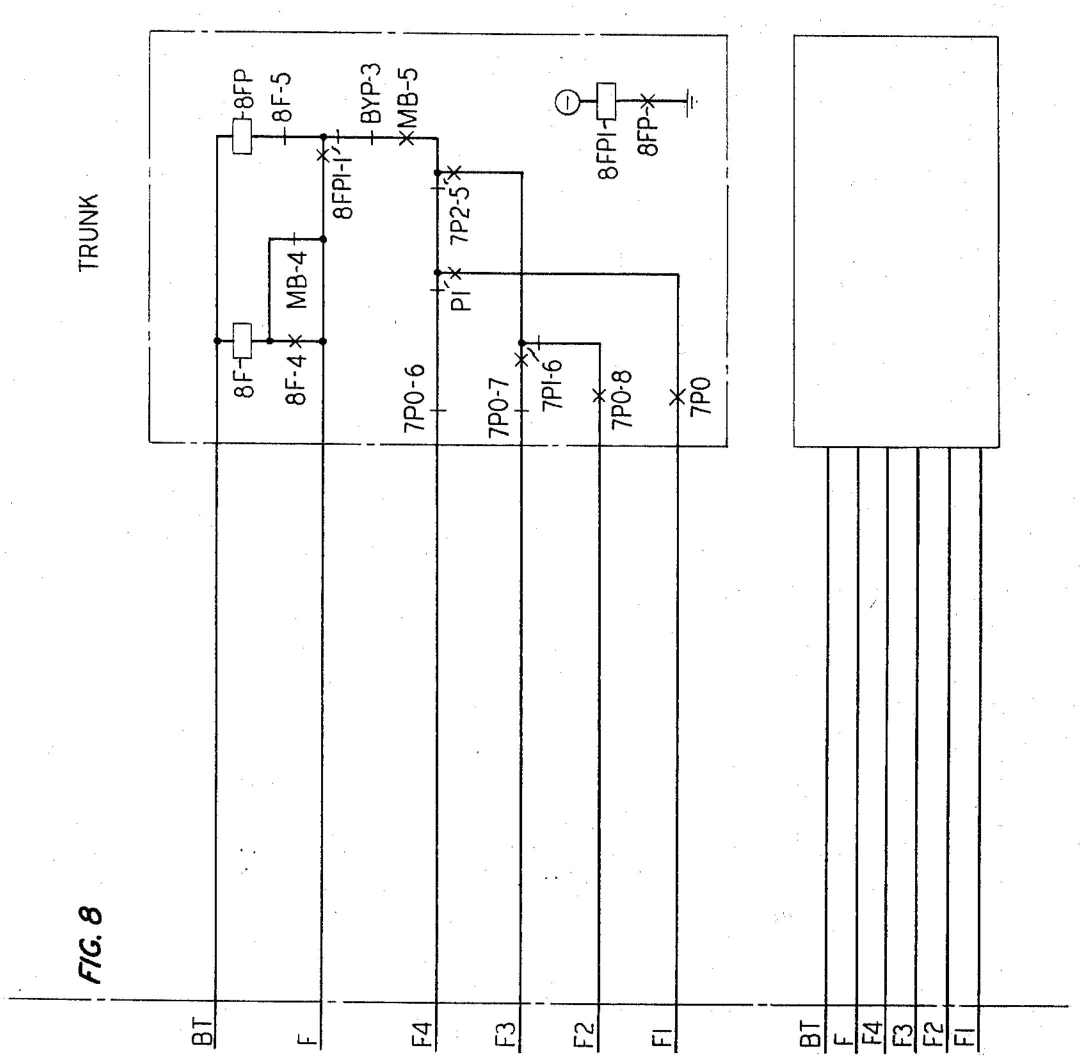

FIGS. 2 and 7 show in detail the manner in which the marker causes the preference level of each call to be stored on the preference relays in the trunk over which the call is completed.

The preference level of the call is transmitted to the marker at the time the call is being set up or established through the switching system. In accordance with the arrangement described in Patent 3,150,236, Sept. 22 1964, of J. W. Gorgas, G. A. Hurst, J. S. Pfrommer and W. H. Scheer, the calling subscriber dials certain digits as part of the calling information, which digits are employed to designate the preference level of the call.

The marker receives these digits from the originating register and if the class of service of the calling station entitles this station to place calls of the indicated preference, then some one of the preference level relays 2PRL0–2PRL4 in the marker is operated. Conversely, if the call is nonpre-emptable, such as due to a permanent signal or other trouble condition, the 2NPC relay operates and causes its contacts 2NPC–2 to 2NPC–5 to open and prevent the operation of any of the preference level relays 2PRL1–2PRL4.

In addition the operation of a nonpre-emptable call relay 2NPC causes its contacts 2NPC–1 to close which in turn causes the preference relay 2PRL0 to operate.

Assume now that the call is a preference call and that the originating subscriber is entitled to make such a call. Under these circumstances one lead from the preference digit receiver and register circuit will have ground applied to it, causing one of the preference level relays 2PRL0–2PRL4 to operate and designate the preference level of the call. The lowest preference level will cause the 2PRL4 relay to operate, the next highest preference level will cause the relay 2PRL3 to operate while the highest preference level will cause the 2PRL0 relay to operate. In each instance, however, only one of these relays is operated at a time for any given call.

At the time the marker is setting up the call, the marker will be connected to the outgoing trunk circuit through contacts of the marker connector relay 3MC in the trunk link frame connector and contacts of level relay LV in the trunk link frame. At this time either the frame relay 8F or the frame pre-empt relay 8FP in the out trunk will also be operated causing contacts 8F–1, 8F–2, and 8F–3 (FIG. 7) or contacts 8FP–1, 8FP–2, and 8FP–3 (FIG. 7) to be operated.

As will be described, if the trunk was idle, then the frame relay 8F in the trunk will be operated when this trunk is selected by the marker. If the trunk is to be pre-empted then the frame pre-empt relay 8FP will be operated.

The operation of the frame pre-empt relay causes contacts 8FP–4, FIG. 7, to close and complete a down check circuit through the break contacts 7P0–1, 7P1–1, and 7P2–1 of the prefer storage relays in the trunk circuit. If these relays are all released, then the preference check relay 7PDK operates and causes its locking contacts 7PDK–1 to close and complete a circuit for maintaining itself operated under control of contacts 8FP–4. The operation of the preference down check relay also causes contacts 7PDK–2 to close and these contacts in combination with contacts MB–1 (FIG. 7) on the make busy relay MB (not shown) which is also operated at this time to prepare a locking circuit for maintaining the preference relays 7P0, 7P1 and 7P2 operated.

At this time the marker also causes a store preference relay STPR (not shown) to operate and close contacts STPR–1, STPR–2, and STPR–3 with the result that circuits are completed from the contacts of the marker preference relays to the windings of the trunk preference relays 7P0, 7P1, and 7P2.

None of the preference relays 7P0, 7P1, and 7P2 is operated in response to the operation of the lowest preference level relay 2PRL4 in the marker circuit. In response to the operation of the 2PRL3 relay the 7P0 relay remains released and the 7P1 and 7P2 relays operate. In response to the operation of the 2PRL2 relay the 7P0 relay and the 7P2 relay operate while the 7P1 relay remains released. In response to the operation of the 2PRL1 relay the 7P0 relay and the 7P1 relay operate while the 7P2 relay remains released. In response to the 2PRL0 relay operating all three trunk preference relays 7P0, 7P1, and 7P2 are operated.

The circuit for the operation of the 7P0 relay in response to the operation of the 2PRL0 relay may be traced from ground through the operated contacts 2PRL0–1, the break contacts 4TLV–1 of the two-level relay, the operated contacts STPR–1 of the STPR relay, the break contacts KPR–1 of the KPR relay (not shown), the marker connector relay contacts 3MC–1, the level relay LV contacts and then through either the contacts 8F–1 or the contacts 8FP–1 to battery through the winding of the 7P0 relay.

The operation of preference store relay 7P0 closes its locking contacts 7P0–2 and completes a circuit for maintaining itself operated from ground through the operated make busy relay contacts MB–1, then through the break contacts 8FP–5 of pre-empt frame relay 8FP if the frame relay 8F is operated, or through contacts 7PDK–2 of the preference down check relay PDK if relay 8FP is operated, and then through the locking contacts 7P0–2 to battery through the winding of the preference store relay 7P0.

Similar circuits may be traced for the operation of the preference store relays 7P1 and 7P2 depending upon the operation of the preference level relays 2PRL0–2PRL4 as described above. In each case the locking circuit for the corresponding outgoing trunk preference storage relays 7P0 through 7P2 is completed similar to the locking circuit described above for the 7P0 relay.

After adequate time has been allowed for the various trunk preference storage relays 7P0, 7P1, and 7P2 to operate and lock, the marker will advance and cause a check preference relay KPR (not shown) to operate to check the operation of the preference relays as described above. The operation of the KPR relay causes its contacts KPR–1, KPR–2, KPR–3, all in FIG. 2, and KPR–4, FIG. 6, to close. The operation of the contacts KPR–1, KPR–2, and KPR–3 interrupts the above-described operating circuits for the 7P0, 7P1, and 7P2 relays and completes circuits for the operation of the corresponding check preference relays 2KTP0, 2KTP1 and 2KTP2 if the corresponding 7P0, 7P1, or 7P2 relay is locked operated. The operating circuit for the 2KPT0 relay extends from battery through the winding of this relay, operated contacts KPR–1, the operated contacts 3MC–1 of the marker trunk link connector relay, contacts LV of the trunk link frame and then either the contacts 8F–1 of the frame relay or contacts 8FP–1 of the pre-empt frame relay, the locking contacts 7P0–2 of the preference store relay to ground through either the break contacts 8FP–5 of the frame pre-empt relay and the contacts MB–1 of the make-busy relay or through the operated contacts 7PDK–2 of the preference down check relay and the operated contacts MB–1 of the make-busy relay. The check preference relay 2KTP0 operates to the locking ground of the preference store relay 7P0. Similarly, relay KTP1 will operate to the locking ground of relay 7P1 provided this relay is operated and relay KTP2 operates to the locking ground of relay 7P2 when relay 7P2 is operated.

(2) *Check of preference level relays*

Figure 6:
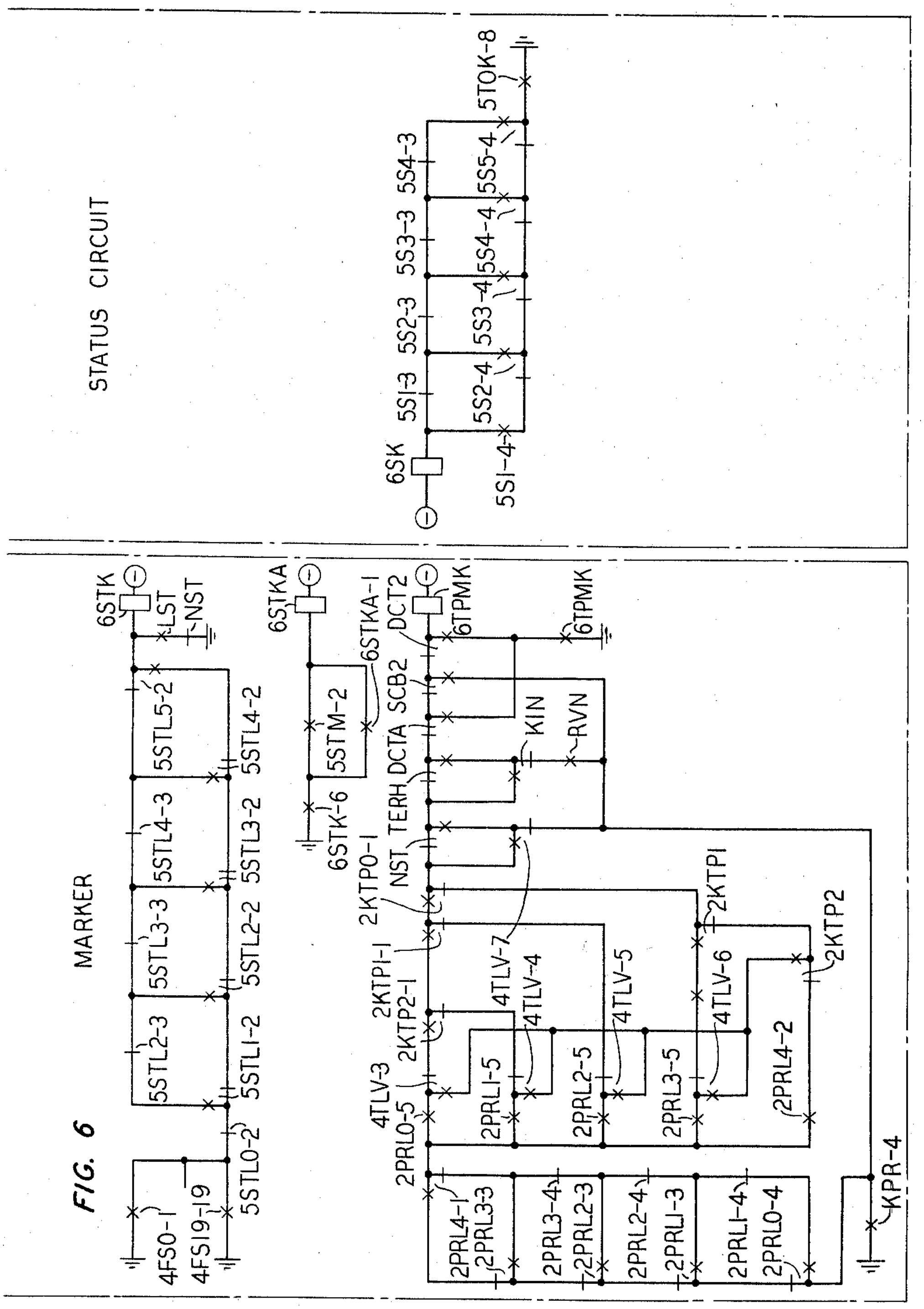
FIG. 6 shows a check circuit for checking the storage of the preference level of a call in the trunk circuit employed to complete the call and a circuit for checking the operation of the status circuit.

In FIG. 6 is illustrated a portion of the checking circuit including the checking contacts on the preference level relays 2PRL0 through 2PRL4 and the check preference relays 2KTP0, 2KTP1, and 2KTP2. The operation of the relay KPR as described above causes contacts KPR–4 to close and apply ground to checking circuit comprising contacts 2PRL0–4, 2PRL1–3, 2PRL1–4, 2PRL2–3, 2PRL2–4, 2PRL3–3, 2PRL3–4 and 2PRL4–1. These contacts are arranged in a circuit such that a path will be completed through these contacts if and only if one and only one of the preference level relays is operated.

In addition, as described above, the operation of relay 2PRL0 for example, causes all of the relays 7P0, 7P1, and 7P2 to operate. As a result, relays 2KTP0, 2KTP1 and 2KTP2 should also operate. Under these circumstances a circuit is completed from ground through contacts KPR–4 of the KPR relay, operated contacts 2PRL0–4 and break contacts 2PRL1–4, 2PRL2–4, 2PRL3–4, and 2PRL4–1, respectively, and then through the operated contacts 2PRL0–5, the break contacts 4TLV–3 of the two-level relay and the operated contacts 2KTP2–1, 2KTP1–1, and 2KTP0–1, respectively, and then through other break contacts of relays whose operation is not of significance at this time to battery through the winding of the trunk precedence memory level checked relay 6TPMK causing this relay to operate to indicate that the proper operation of the preference relays in the marker and trunk circuits has been checked.

Similar checking circuits are shown for the operation of the other preference level relays 2PRL1, 2PRL2, 2PRL3, and 2PRL4 and the corresponding proper trunk preference store check relays 2KTP0, 2KTP1 and 2KTP2.

If only two-level preference is provided in the trunk group, then the two-level relay 4TLV will operate as discussed below and cause contacts 4TLV–1, 4TLV–2, FIG. 2, and 4TLV–3, 4TLV–4, and 4TLV–5, FIG. 6, to operate with the result that the operation of any of the marker preference level relays 2PRL0 through 2PRL3 will cause relay 7P2 to operate and in turn cause the operation of this relay to be checked by the checking circuits of FIG. 6, which operate in a similar manner to that described above.

(3) *Marker and status circuit operations*

When the marker has a call which is to be routed over one of a group of outgoing trunks such as one of the trunks of group 118 the marker will first operate a route relay which is employed to designate this group of trunks. If the designated trunk group is not provided with preference features then a relay such as R5 (not shown) will operate and close its contacts, FIG. 4. These contacts in turn are cross-connected to a relay such as 4NPM, and as a result the marker will proceed to select a trunk of this group in the normal manner such as described in the above-identified Erwin publication.

If the trunk group is provided with two levels of preference then the selected route relay such as R2 will be operated and close contacts R2–1 and R2–2. These relay contacts are cross-connected to the 4TLV relay indicating two-level preference and to a number of the frame test common relays FTC, such as 4FTC2, so that thereafter the marker will proceed to select the trunk of this group or to pre-empt a trunk of this group.

Figure 4:
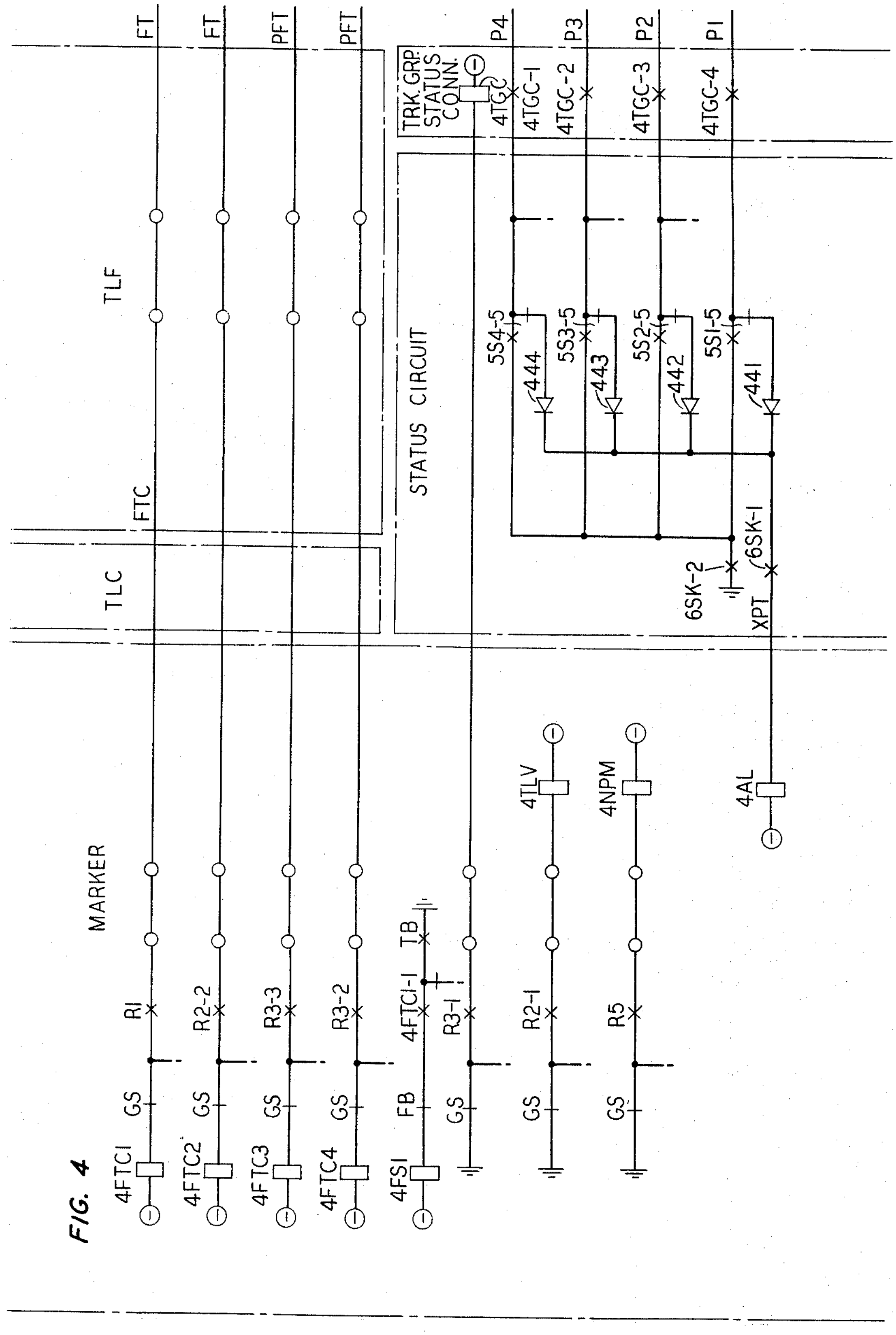
FIGS. 4 and 9 show the manner in which the status circuit conditions the trunks on the various trunk link frames having the lowest preference calls in progress so that one such frame may be selected by the marker.

If the trunk group is arranged to provide multilevel preference and pre-emption in accordance with our invention, then the route relay contacts will be interconnected or cross-connected as shown in FIG. 4. Here the route relay R3 (not shown) is assumed to designate a trunk group provided with preference and pre-emption in accordance with our invention. Contacts R3–1 close on this route relay and complete an obvious circuit for the operation of the trunk group relay 4TGC individual to the trunk group designated by route relay R3. In addition, the route relay R3 causes other contacts illustrated by contacts R3–2 and R3–3 to close and these contacts are in turn interconnected with frame test common relays 4FTC3 and 4FTC4 to permit the marker to select a trunk link frame on which at least certain of the trunks of the group appear and which are available to be selected.

The operation of the 4TGC relay causes its contacts 4TGC–1, 4TGC–2, 4TGC–3, and 4TGC–4 (FIG. 4) and contacts 4TGC–5, 4TGC–6, 4TGC–7, 4TGC–8, 4TGC–9, 4TGC–10, 4TGC–11, and 4TGC–12 (FIG. 5) to operate.

The operation of this relay and these contacts causes the various trunk circuits of the group to be interconnected with a status circuit in accordance with our invention. As described herein this status circuit is individual to a marker circuit or may be considered a part of the marker circuit since each marker is provided with such a status circuit. The operation of the 4TGC relay causes the status circuit to be interconnected with the various relay contacts in the individual trunk circuits of the selected group of trunks.

Figure 10:
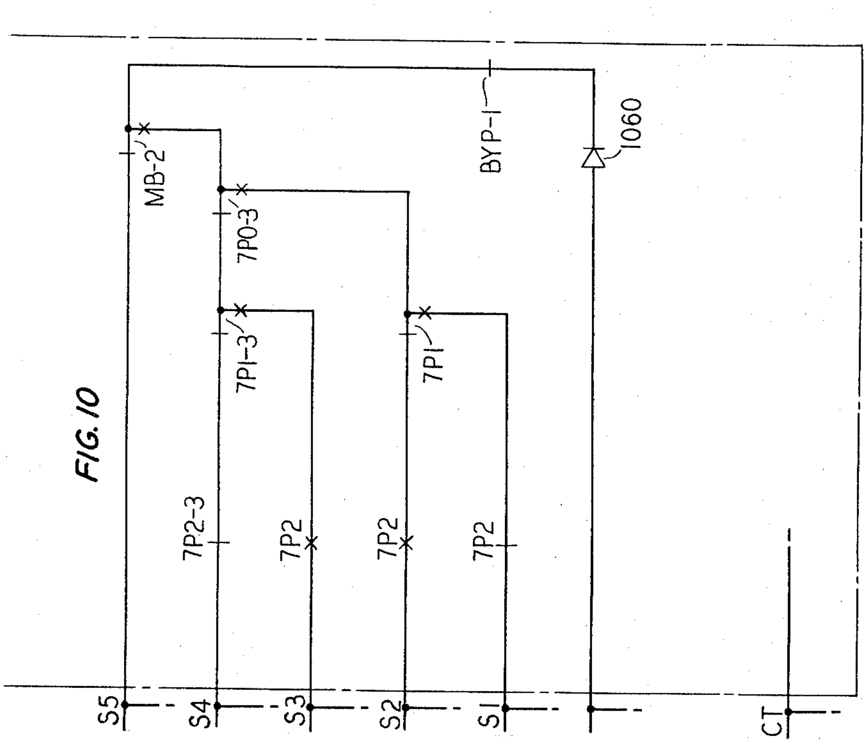

The contact circuits of FIG. 10 represent the contact circuits of the preference store relays 7P0, 7P1, and 7P2, as well as the make busy relay MB and a make busy preference relay BYP (not shown) individual to one of the trunk circuits of the trunk groups. Corresponding relay contacts of each of the trunks of the trunk group are interconnected in a circuit such as shown in FIG. 10. All of these circuits are then connected in parallel with the contacts of the trunk group connector relay 4TGC as indicated in FIG. 10.

Figure 5:
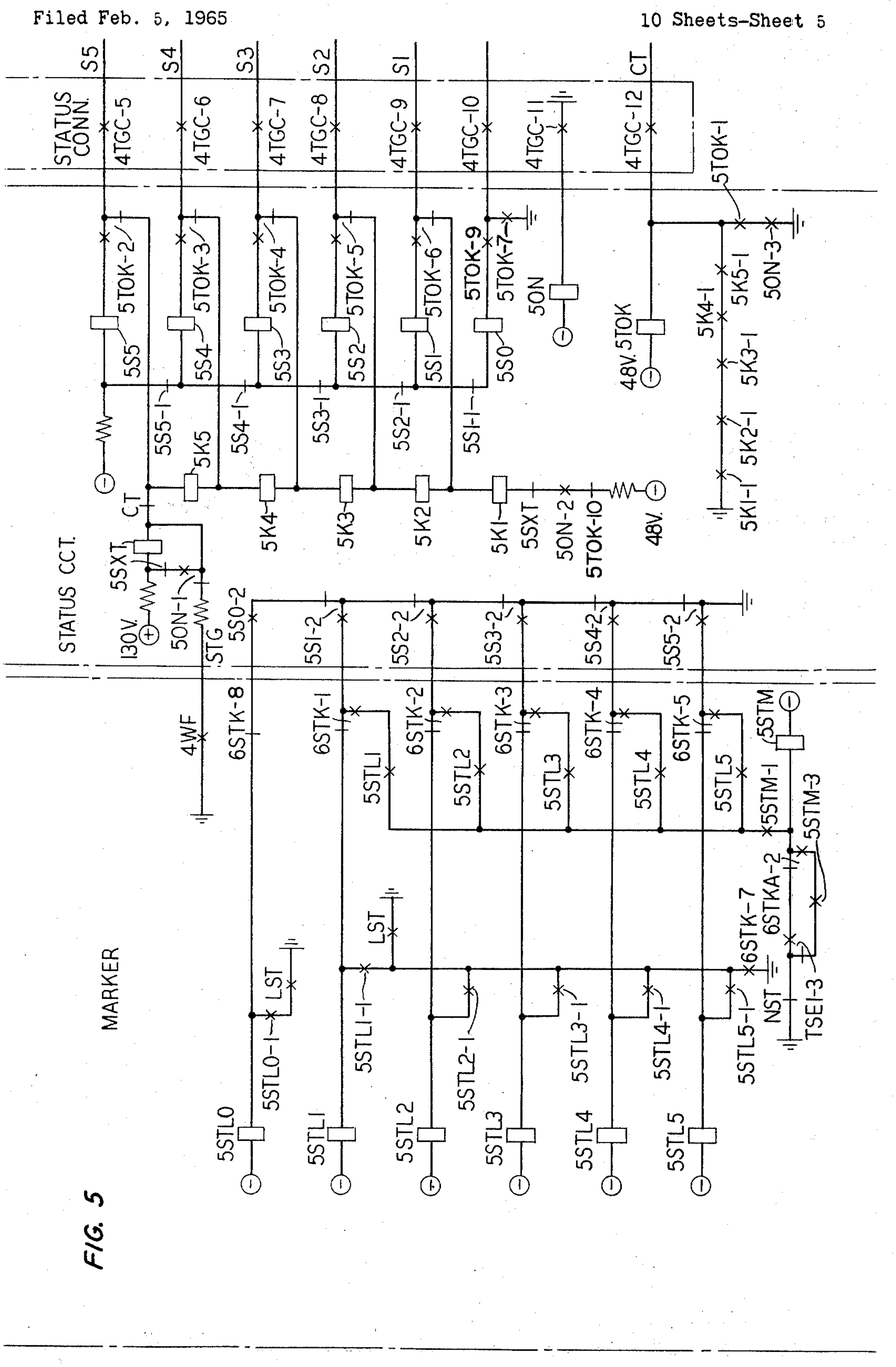
FIGS. 5 and 10 show in detail the manner in which the marker determines the lowest preference of a call in a group of trunks.

Since these trunk circuits and the contact networks of FIG. 10 are usually located some distance from the status circuit and the marker circuit, it is desirable to check the interconnecting leads for trouble conditions such as trouble battery, trouble ground or crosses and the like. Such a circuit is shown in FIG. 5 and comprises status cross test relay 5SXT and check relays 5K1, 5K2, 5K3, 5K4, and 5K5. The operation of the off-normal relay 5ON in response to the closure of the contacts 4TGC–11 on the trunk group connector relay causes the contacts 5ON–1 and 5ON–2 to close and activate the series circuit of the windings of the check relays 5K1 through 5K5 to check the various leads extending to the trunk circuit from the status circuit. If no trouble conditions are encountered on these leads, then status cross test relay 5SXT will not operate but each of the check relays 5K1, 5K2, 5K3, 5K4, and 5K5 operates and closes the corresponding contacts 5K1–1, 5K2–1, 5K3–1, 5K4–1, and 5K5–1 for operating the test O.K. relay 5TOK. This relay, in operating, closes the locking contact 5TOK–1 and thus maintains itself operated under control of the operated contacts 5ON–3 on the off-normal relay.

Should another marker attempt to establish a call to a trunk of this same trunk group at this time then the operation of the second TGC relay will cause a contact corresponding to contact 4TGC–12 to close and cause the operation of the test O.K. relay TOK in the status circuit associated with the second marker without first performing the trouble test because the first marker will possibly apply ground to certain of these leads as will be presently described. The simultaneous connection of two status circuits to these leads does not interfere with the proper operation of either status circuit or either of the marker circuits.

The operation of the test O.K. relay 5TOK causes contacts 5TOK–2, 5TOK–3, 5TOK–4, 5TOK–5, 5TOK–6, and 5TOK–7 and 5TOK–9 to operate and disconnect the trouble testing circuit comprising the check relays 5K1 through 5K5 inclusive, from the status conductors and connects the status relays 5S0 through 5S5, inclusive, to the respective conductors extending to the various trunks of the selected trunk group. Also the operation of contacts 5TOK–7 and 5TOK–9 connects ground to the right-hand terminal of the winding of the status relay 5S0 and also through the contacts 4TGC–10 to the diode 1060 and the contact networks in each of the trunks of the group shown in FIG. 10.

If any trunk of this group is idle, then a circuit may be traced through the contact network of such idle trunk or trunks from ground through the operated contacts 5TOK–7 of the test O.K. relay, the operated contacts 4TGC–10, diode 1060, and break contacts BYP–1 of the preference busy relay (not shown) in such idle trunks, and then through the break contacts MB–2 of make busy relay (not shown) in such idle trunks and then over the operated contacts 5TGC–5, and the operated contacts 5TOK–2 of the test O.K. relay to battery through the winding of the status relay 5S5, thus causing the relay 5S5 to operate.

Such trunks of the group as are busy at this time may provide other paths through the contact network and through other of the contacts of the trunk group connector relay to the status circuit and then through the operated contacts of the test O.K. relay to the windings of other of the status relays. However, the operation of the status relay 5S5 as described above causes the contacts 5S5–1 to open and thus remove battery from the left-hand winding terminals of these status relays 5S4, 5S3, 5S2 and 5S1, thus preventing any of these relays from operating.

Consequently, so long as any trunks in the trunk group are idle, the status relay 5S5 will operate and prevent the operation of any of the other status relays.

When all of the trunks of the trunk group selected by the marker by the route relay R3 are busy, then all of the make-busy contacts such as MB–2, FIG. 10, in the individual trunk circuits will become operated and thus interrupt the above-described circuit for the operation of relay 5S5 in response to the operation of the 4TGC relay and the closure of its contacts 4TGC–10 and 5TGC–5, as described above.

When each of these trunks became busy, the marker of course stored upon the individual trunk preference store relays 7P0, 7P1, and 7P2 the preference rating of the call established over the trunk. Consequently, when all the trunks become busy, and if it is desired to establish another call over this group of trunks, then when relay 4TGC operates as described above, and if any of the trunks have nonpriority calls in progress thereover, the relays 7P0, 7P1, and 7P2 will all be released. Consequently, the contacts in this trunk circuit corresponding to contacts 7P0–3, 7P1–3, and 7P2–3 will all be released and the make busy relay contacts MB–2 operated so that a circuit now extends from the ground through operated contacts 5TOK–7, the operated contacts 4TGC–10, the diode 1060, the break contacts BYP–1 of the preference busy relay, and the operated contacts MB–2 of the make-busy relay, and then through the break contacts 7P0–3 of the preference store relay 7P0, the break contacts 7P1–3 of the preference store relay 7P1, the break contacts 7P2–3 of the preference store relay 7P2, the operated contacts 4TGC–6, the operated contacts 5TOK–3 to the winding of the status relay 5S4. With the status relay 5S5 released, the operating circuit for the status relay 5S4 is then completed through the break contacts 5S5–1 to battery. As a result status relay 5S4 operates and operates its contacts 5S4–1, thus preventing the operation of any of the other status relays 5S3, 5S2, or 5S1.

If none of the trunks are idle and if none of the busy trunks are employed for nonpreference calls, then one or more of the break contacts of the preference store relays similar to 7P0–3, 7P1–3, and 7P2–3 in all of the trunk circuits of the group will be operated so that the above-described path for the operation of the 5S4 relay will be interrupted.

If some of the calls have the lowest preference rating, then the status relay 5S3 will operate and in turn prevent the operation of the status relays 5S2 and 5S1 due to the operation of contacts 5S3–1. If all of the trunks are busy, and none of them are engaged for calls of no preference or the lowest preference, but some of the trunks are employed for calls having the next highest level of preference, then a circuit will be completed through the contacts of such trunks to the winding of relay 5S2, thus causing this relay to operate.

Thus, one and only one of the status relays 5S0 through 5S5 is operated at any given time, and the operation of such relay designates the lowest level preference of a call over any of the trunks of the trunk group over which it is desired to establish another call.

The operation of one of the status relays 5S0 through 5S5 causes the operation of one of the corresponding contacts 5S0–2 through 5S5–2 to close and complete an obvious circuit for the operation of a corresponding one of the status level relays 5STL0 through 5STL5. The operation of any of the relays 5STL1 through 5STL5 causes the corresponding locking contacts 5STL1–1 through 5STL5–1 to close and complete a circuit for maintaining such relay operated under control of contacts 6STK–1 of the status level check relay 6STK.

The operation of relay 5TOK, as described above, in addition to closing the contacts described above, also causes contacts 5TOK–8, FIG. 6, to close. Contacts 5TOK–8 in closing and in addition the operation of one and only one of the status relays 5S1 through 5S5 complete a circuit through the contact network comprising the contacts 5S1–3, 5S2–3, 5S3–3, 5S4–3 and 5S1–4, 5S2–4, 5S3–4, 5S4–4, and 5S5–4 for the operation of the status check relay 6SK. This relay in operating in turn causes contacts 6SK–1 and 6SK–2, FIG. 4, to operate.

Figure 9:
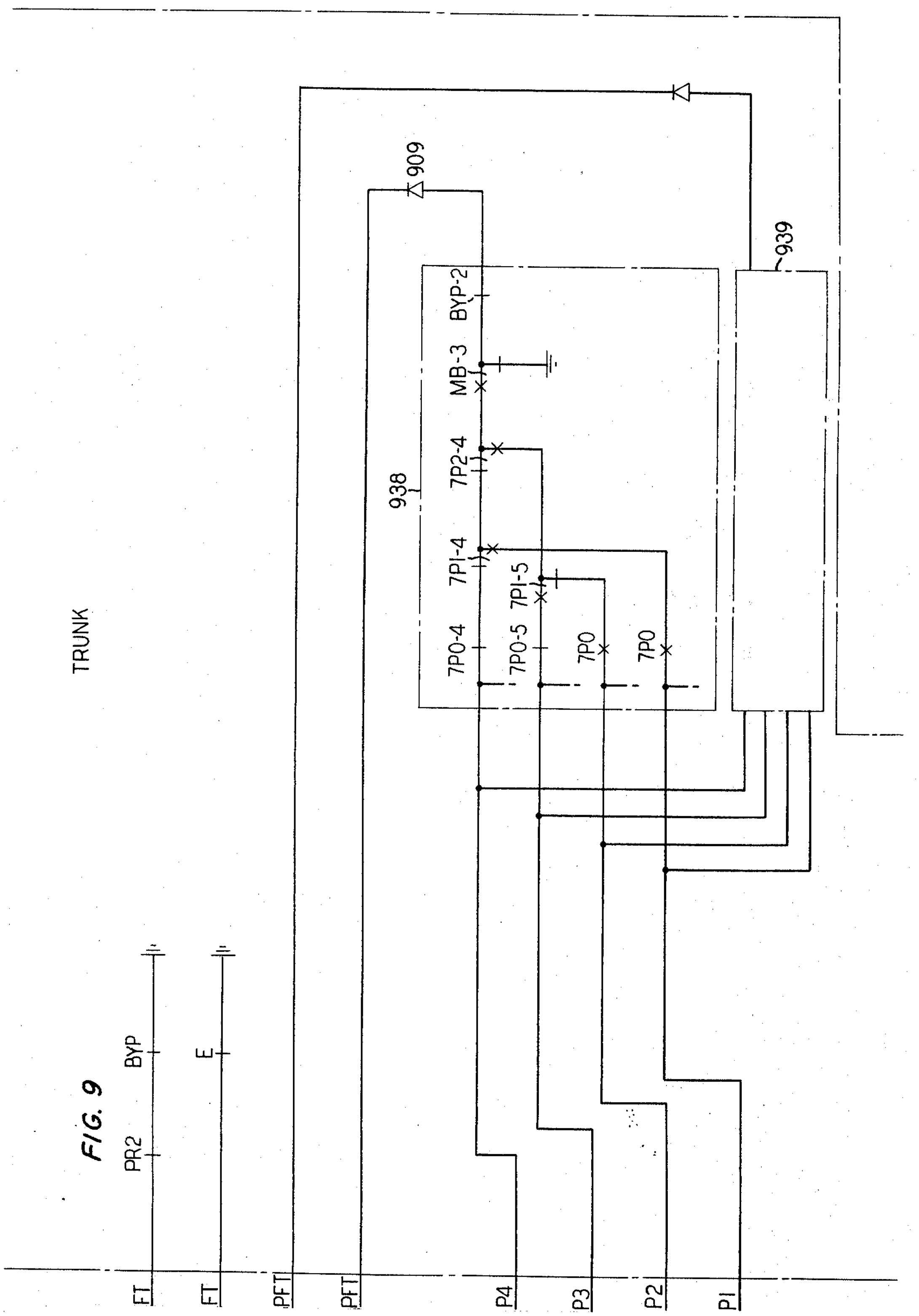
Figure 11:
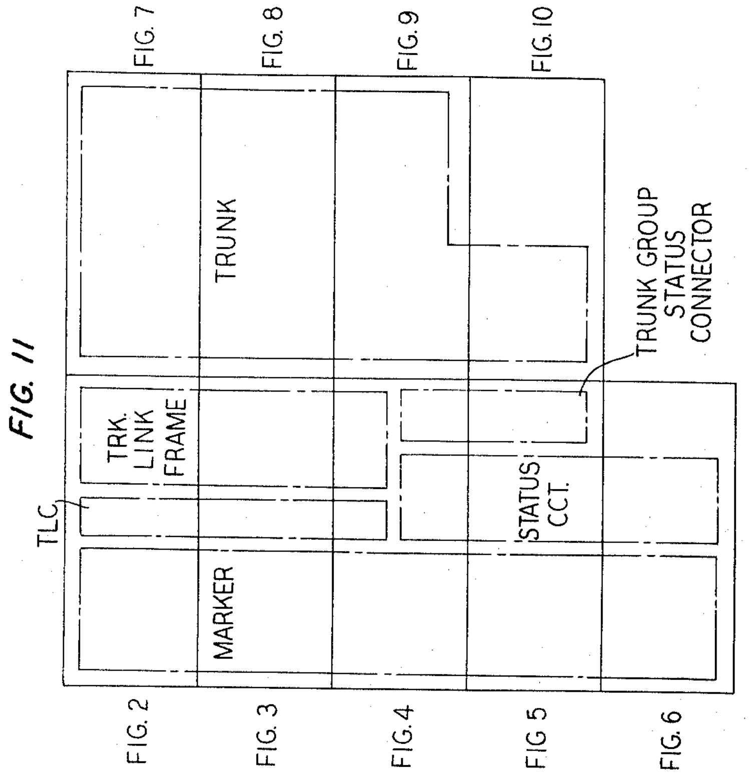
FIG. 11 is a key diagram showing the arrangement of FIGS. 2–10.

Contacts 6SK–1, in operating, connect the alarm relay 4AL in the marker to the conductors from the trunk status circuit extending through the operated contacts 4TGC–1, 4TGC–2, 4TGC–3, and 4TGC–4 of the operated 4TGC relay to contacts in the trunk circuit as shown in FIG. 9. If any of these conductors is grounded at this time, this trouble ground is applied from any of these conductors through the break contacts 5S1–5, 5S2–5, 5S3–5, and 5S4–5, and through the individual diodes 441, 442, 443, and 444, and the operated contacts 6SK–1 to the winding of the trouble relay 4AL which will operate and indicate to the marker that a trouble condition exists whereupon the marker will advance and respond to the trouble condition in the usual manner.

The contact network 938 represents a network through the contacts of the preference store relays P0, P1, P2 in each trunk circuit. These contacts in the respective trunk circuits are connected in parallel as indicated by the multiple connections within the rectangle 938 for all of the trunks in the trunk group which appear on some one of the trunk frames. Similar contact networks 939 are provided for all of the trunks in the trunk group which appear on another one of the trunk link frames.

Similar groups of contact networks are provided and connected in parallel for the individual trunks within the group which appear on the various ones of the trunk link frames.

If it is first assumed that the trunks within the trunk group are idle when it is desired to establish a call over one of these trunks, then the trunks which are idle will have the make busy relay released so that contacts MB–3 and BYP–2, FIG. 9, will be normal with the result that ground through these contacts and the diode 909 will be cross connected through the R3 route relay contacts R3–2 to the relay 4FTC4 designating the frame on which such an idle trunk appears. If idle trunks appear on more than one frame then additional ones of the FTC relays will be operated and the marker thereafter will select one frame and then a trunk upon that frame in the manner described in the above-identified Erwin publication.

If all of the trunks are busy, and another call is directed to the group of trunks, then the contacts MB–3, FIG. 9, will be operated and the above-described paths for operating the 4FTC relays designating the frames having idle trunks of the group will not operate so that normally busy tone would be returned to the subscriber. However, when the trunks of the group are provided with the preference and pre-empt features, in accordance with our invention, the ground from the break contacts MB–3 is removed but ground from contacts 6SK–2, FIG. 4, is substituted therefor on those frames having trunks engaged by calls having the lowest preference. Thus, assume, for example, that the group of trunks on the frame for which the circuits are shown in detail in FIG. 9 are busy and that certain of the trunks on this frame in the group in question are in use for calls having no preference. Under these circumstances, the contacts 7P0–4, contacts 7P1–4 and contacts 7P2–4 will all be released. In addition, the status relay 5S4 in the status circuit will be operated so that contacts 5S4–5 will also be operated. Consequently, a circuit may now be traced from ground through the operated contacts 6SK–2, operated contacts 5S4–5, operated contacts 4TGC–1, break contacts 7P0–4, break contacts 7P1–4, break contacts 7P2–4, operated contacts of the MB–3 relay, the break contacts of the BYP–2 relay, and then through diode 909, the R3 route relay contacts R3–2 in the marker, and break contacts of the ground supply relay GS, not shown, to the frame test common relay 4FTC4 designating the frame on which these trunks are located. Similar circuits may be traced from ground through the contacts 6SK–2 and the operated contacts 5S4–5, and the operated contacts 4TGC–1 and then through the contact network in other trunks of the selected trunk group on other frames which are engaged by calls having the same preference and then to the FTC relay in the marker designating such other frames.

The preference level P3, the lowest level of preference calls over the group of trunks, is designated by the operation of the status relay 5S3. When this is the lowest preference level of calls over the trunks of the group the circuit for the operation of the FTC relays designating the frames on which such trunks are located may be traced from ground through the operated contacts 6SK–2, the operated contacts 5S3–5, operated contacts 4TGC–2 relay, break contacts 7P0–5 relay, the operated contacts 7P1–5, and the operated contacts 7P2–4 relay, and then through the operated contacts MB–3 of the make busy relay and the break contacts BYP–2 of the busy preference relay and then over the above-described circuit for the operation of the corresponding FTC relays in the marker.

Similar circuits may be traced if the lowest level preference call within the group of trunks is designated by the operation of the status relay 5S2 or the status relay 5S1.

If the busy preference relay is operated and the contacts BYP–2 thus opened, when the trunk in question is nonpre-emptible, such as when a register or sender is attached, then all of the above paths are open and busy tone or other indications will be returned to the calling subscriber.

The operation of the various 4FTC relays causes contacts such as 4FTC–1 in the marker to close. These contacts are connected in a selection chain circuit. These contacts as well as other selecting contacts in this chain cause a select one of the frame select relays such as 4FS1 to operate through break contacts of a frame busy relay FB, not shown, in the same manner as described in the above-identified Erwin article.

The operation of some one of the marker frame select relays 4FS causes a corresponding one of the contacts such as 4FS0–1 or 4FS19–1, FIG. 6, to close and connect ground to a contact network comprising contacts on the status level relays 5STL0, 5STL1, 5STL2, 5STL3, 5STL4, and 5STL5. This contact network comprises contacts 5STL0–2, 5STL1–2, 5STL2–2, 5STL3–2 5STL4–2, 5STL2–3, 5STL3–3, 5STL4–3, and 5STL5–2, and is arranged so that if some one and only one of the status level relays 5STL1, 5STL2, 5STL3, 5STL4 or 5STL5 is operated a path is completed through this network from ground from the operated one of the frame select relay contacts 4FS0–1 to 4FS19–1 and the break contacts 5STL0–2 relays to the winding of the status level check relay 6STK.

The operation of relay 6STK causes contacts 6STK–1 to 6STK–5, FIG. 5, to close and transfer the contacts 5S1–2 through 5S5–2 from the windings of the respective relays 5STL1 through 5STL5 to the winding of the status maintained relay 5STM through contacts of the respective status level relays 5STL1 through 5STL5 and contacts 5STM–1 of the status maintained relay 5STM. The operated one of the status level relays 5STL1 through 5STL5 remains locked operated under control of the contacts 6STK–7.

Later, as described herein, when the marker is ready to select a trunk circuit the trunk select relay TSE1 in the marker, not shown, operates and closes its contacts TSE1–3, thus completing a circuit for the operation of relay 5STM.

The operation of status maintained relay 5STM closes its contacts 5STM–2, FIG. 6, which complete a circuit for the operation of auxiliary status level check relay 6STKA. This relay in turn closes its locking contacts 6STKA–1, thus locking this relay operated under control of contacts 6STK–6 of the status level check relay 6STK.

The contacts 6STKA–2, FIG. 5, are also closed by the operation of relay 6STKA. The operation of these contacts interrupts the operating circuit of relay 5STM. However, if the condition of status circuit relays 5S0 to 5S5 has not changed, a locking circuit will be completed for holding relay 5STM operated from battery through its winding and its operated contacts 5STM–1, the operated contacts of the operated one of the status level relays 5STL0 through 5STL5 and operated contact of the status level check valve relay 6STK such as 6STK–2, to ground through the operated contact such as 5S2–2 of the corresponding status relay, for example. Thus, if the condition of the status circuit is maintained during the time that a trunk is being selected the status maintained relay 5STM remains operated. Then after a trunk is selected the trunk select relay TSE1 in the marker, not shown, releases and an additional locking circuit for relay 5STM is completed through the operated contacts 5STM–3 and 6STKA–2.

If the condition of the status circuit is not maintained unchanged during this time, the status maintained relay 5STM releases, and if a trunk is not selected; the marker route advances; but if this relay remains operated and a trunk is not selected, the marker advances and records a trouble indication.

Before the selected trunk link frame is seized by the marker, in order to select one of the trunks thereof, it is desired to check the preference level of the incoming call with the lowest preference level of the calls in progress over the trunks of the selected trunk group.

(4) *Comparison of preference level*

In FIG. 2 there is shown a circuit for comparing the two preference levels. As described herein the preference level relays 2PRL0 through 2PRL4, inclusive, are employed to record and designate the preference level of the incoming call, that is the call which it is desired to route over one of the trunks of the selected trunk group. In addition the status level relays 5STL0 through 5STL5 in the marker are employed to designate the lowest level preference call in progress over the trunks of the selected trunk group. These relays designate the respective levels in the manner described above.

The operation of any FTC relay, FIG. 4, as described above, in turn causes the operation of a frame test common check relay FTCK, not shown, in the usual manner. Contacts FTCK–1 on this relay then complete a circuit for comparing the preference level of the various calls. The operation of the status level check relay 6STK as described above in turn causes contacts 6STK–7 to close.

If the trunks of the trunk group are not arranged to provide the multilevel preference and pre-emption in accordance with our invention, a relay NST, not shown, is operated in the marker so contacts NST–1 on this relay are closed and complete a circuit through the operated contacts such as 4FS–2 on the operated frame select relay will in turn then operate the marker connector relay 2MP on the trunk link frame. This marker preference relay will in turn then operate he marker connector relay 3MC and cause the marker to be connected to the trunk group so that one of the available trunks may be selected by the marker.

If the trunks of the selected trunk group are provided with multilevel preference and pre-emption in accordance with our invention and if some of the trunks of the group are idle, the operation of the contacts 6STK–7 then extends a circuit from battery through the operated contacts FTCK–1 to one terminal of the contact network employed to check the preference of the various calls. If the call is a nonpreference call, then the preference call relay PRC in the marker, not shown, is not operated and the nonpreference call relay NPRC, not shown, will be operated in the marker so that the contact network (FIG. 2) on the preference level relays and the status level relay is by-passed. If idle trunks are available, the status level relay 5STL5 is operated in the manner described above so that the circuit then will extend from the operated contacts NPRC and the operated contacts 5STL5–4 and the operated contacts 4FS–2 to the marker preference relay 2MP on the selected trunk link frame. Alternatively, if none of the trunks are idle, then the 5STL5 relay will not be operated for the reason described above with the result that the no-trunk available relay 2NTA is operated so that the marker will then advance and either select another route or return busy tone to the calling subscriber.

If the call is a preference call, then the contacts of the preference call relay PRC will be operated instead of the contacts of the nonpreference call relay NPRC with the result that a circuit now extends from battery through the operated contacts FTCK–1, the operated contacts 6STK–7, the operated contacts of the PRC relay and then to the contact network of contacts 2PRL0–6, 2PRL1–6, 2PRL2–6, 2PRL3–6, and 2PRL4–6 and the contacts 5STL1–4, 5STL2–4, 5STL3–4, 5STL4–4 and 5STL5–4. This contact network is designed so that, if the preference level of the new or incoming call is equal to or lower than the lowest preference of all the calls in progress over the trunks of the selected trunk group, then the no-trunk avaliable relay 2NTA operates and causes the marker to advance and either select another route or return a busy tone or a priority signal or indication to the calling subscriber.

Alternatively, if the preference level of the new or incoming call is higher than the preference of the lowest preference call in the trunk group, then a circuit is completed through the above networks from the operated contacts of the PRC relay and the contacts 4FS–2 of the frame select relay to the marker preference relay 2MP on the selected trunk link frame.

(5) *Truck circuit selection by marker*

Figure 3:
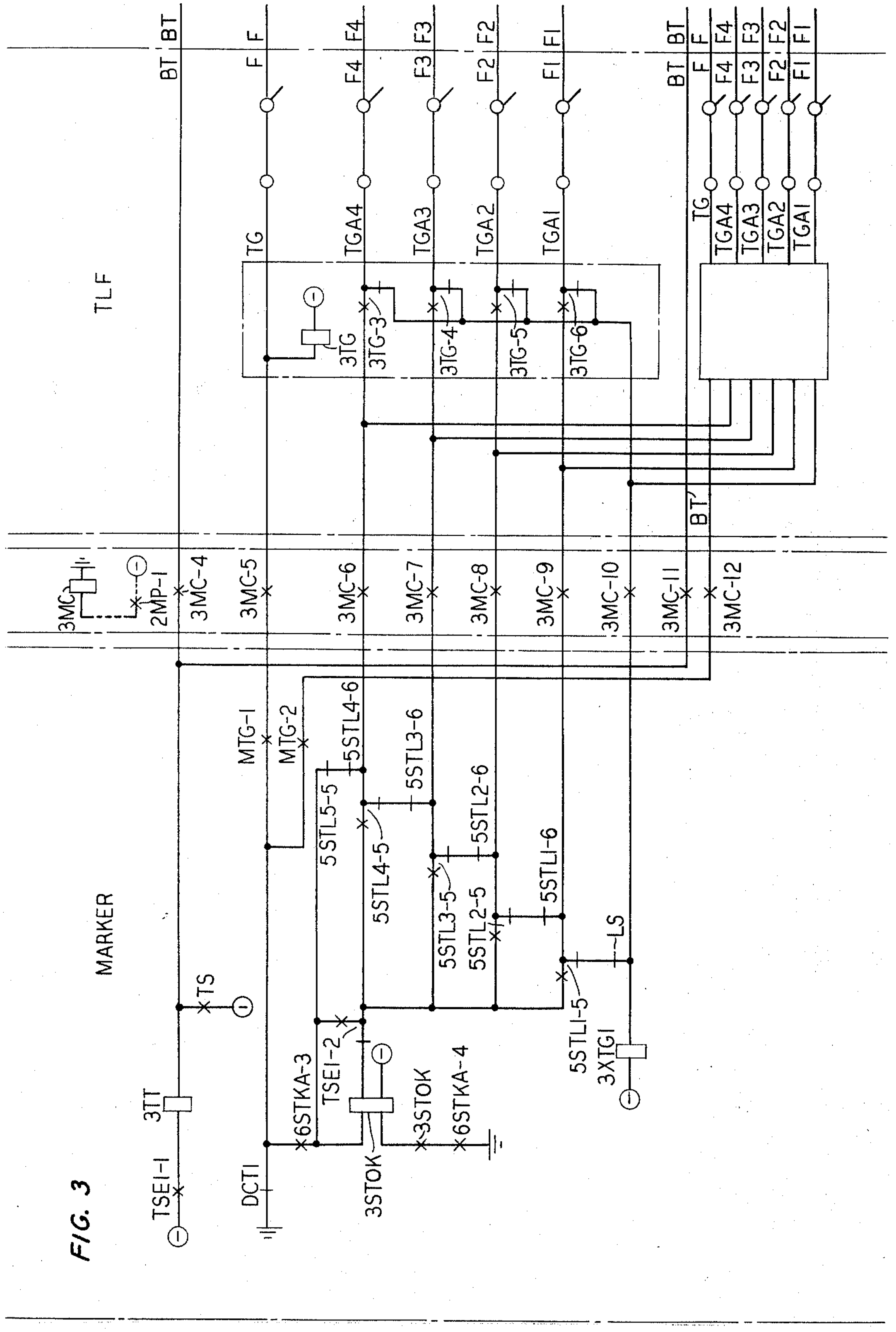
FIGS. 3 and 8 show the manner in which the individual trunk circuits are conditioned for selection by the marker.

The operation of the 2MP relay causes contacts 2MP-1, FIG. 3, to close and operate the marker connector relay 3MC through the marker preference circuit, not shown. The operation of the marker connector relay 3MC then causes the marker to be connected with the selected trunk link frame by causing its contacts 3MC–4 through 3MC–9 to close. In addition the marker causes a marker trunk group relay 3MTG, not shown, to operate and close contacts 3MTG–1. The marker in advancing to the trunk selecting state or condition causes the trunk selecting relays TSE1 and TSE2, not shown, to operate in the usual or normal manner and as a result contacts TSE1–1 are closed. As a result, ground through the break contacts DCT1 of a double connection test relay in the marker, not shown, is transmitted through the operated contacts 3MTG–1, the operated contacts of the 3MC–5 relay to cause the operation of the trunk group relay 3TG. In addition, ground is transmitted over the F conductor to the trunk circuits of the group located on the frame selected by the marker by the operation of the relay 3MC of the marker connector. If any of the trunks are idle, the make busy relay MB in the idle trunks will be normal so that contacts MB–4 will be closed and extend the above circuit from the F conductor through the break contacts MB–4 of the make busy relay MB, the winding of the frame relay 8F, and then over the BT lead back to the marker trunk test relay 3TT. The circuit from the frame relay 8F over the BT conductor on the trunk link frame between the vertical lines extends through trunk block relays in the normal manner as described in the above-identified Erwin article. Since these relays operate in their normal and usual fashion and extend the BT conductor from the trunk to the marker for enabling the marker to select such a trunk, they have not been shown in the drawing since this would needlessly complicate the drawing and understanding of our invention. These relays and circuits may nevertheless be provided when desired or necessary. The trunk test relay or relays in the marker operate in circuits such as described above. The trunk test relay windings have a high resistance so that frame relays in the trunk circuits do not operate at this time. The marker advances and selects one of the trunks and substitutes a low resistance battery for the high resistance of the trunk test relays so the frame relay 8F operates in the circuit of the idle trunk selected and causes contacts 8F–4 to close thus completing the circuit for maintaining itself operated at this time independently of the contacts MB–4 on the make busy relay which will then be opened. This operation is similar to that described in the above-identified publication of Erwin.

If all of the trunks are busy, the contacts corresponding to contacts MB–4 in all of the trunks on this frame of the selected trunk group will be open and consequently a path such as described above is not provided for operating the trunk test relay in the marker or frame relay in the trunk. If the marker has determined that the incoming call is of a higher priority than the lowest level priority calls in progress over the trunks in the selected group which are located on the selected trunk link frame, then when the auxiliary status level check relay 6STKA operates in the marker as described above, it causes contacts 6STKA–3 to close. The closing of these contacts then extends a circuit from ground through the break contacts DCT1, the operated contacts 6STKA–3, the break contacts 5STL5–5 and 5STL4–6, and through the operated contacts TSE1–2 to the contact network on the status level relays 5STL1 through 5STL5 comprising the contacts 5STL5–5, 5STL4–5, 5STL4–6, 5STL3–5, 5STL3–6, 5STL2–5, 5STL2–6, 5STL1–5, and 5STL1–6. This contact network is arranged to provide paths from ground through the contacts DCT1 and 6STKA–3 to the preference conductors extending through the contacts 3MC–6, 3MC–7, 3MC–8 and 3MC–9 to the trunk link frame and then to the contact network on the perference storage relays in the trunks of the selected trunk group located on the selected frame.

Assume for purpose of illustration that the lowest preference calls in progress over the trunks of the selected trunk group are represented by the operation of the status level relay 5STL2 and as a result the contacts 5STL2–5 and 5STL2–6 will be operated. Consequently, circuits extend from ground through the break contacts of the DCT1 relay, the operated contacts 6STKA–3, the break contacts 5STL5–5, and the break contacts 5STL4–6 and then through the contacts 3MC–6 of the marker connector relay, and contacts 3TG–3 of the operated trunk group relay, and over the F4 conductor to the contacts corresponding to contacts 7P0–6 of all of the trunks of the selected trunk group located on the selected frame. If the lowest level preference call in progress over the trunk group at this time is represented by the operation of relay 5STL2, then the preference relay P0 in all of the trunks will be operated with the result that contacts 7P0–6 will be open so that no path will be found over this F4 conductor.

The circuit from the status level relay contacts 5STL4–6 also extends through the break contacts 5STL4–5 and the break contacts 5STL3–6 and then through the marker connnector contacts 3MC–7 and contacts 3TG–4 of the trunk group relay on the trunk link frame to the F3 conductor extending to the break contacts 7P0–7 of all of the preference relays P0 in the selected trunk group located on the selected frame. As before with all the calls in the trunk group having a preference level represented by the status level two relay 5STL2, the preference relay P0 in all of these trunks will be operated so that all of the contacts corresponding to contact 7P0–7 will likewise be operated so that no path will be found over the F3 conductor.

If due to some trouble condition or if due to the status of some one or more trunks of the group changing between the time relay 5STL2 operated and the time the selection operations take place, a path is found through any one of the contact networks of the trunks of the group on the selected frame indicating a lower preference than that designated by the operation of relay 5STL2, then such path will cause the marker to select such trunk or one of such trunks in the manner similar to that described herein with respect to the selection of a trunk of the indicated lowest preference level of the call then in progress.

Assume now that no such path is found through any of the status storage relay contacts in the trunks from the F4 or F3 leads or from the F lead. Instead, circuits will be completed for the operation of the trunk test marker relay 3TT of the trunks on the selected trunk link frame of the selected trunk group from ground through the brake contacts of the DCT1 relay, the operated contacts 6STKA–3, the operated contacts TSEL–2, the operated contacts 5STL2–5, the operated contacts 3MC–8 of the marker connector relay, the operator contacts 3TG–5, and then over the F2 conductor to the various trunks of the selected group located on the selected trunk link frame. Under these circumstances there should be a path extending through the contact network of one or more of such trunks through the operated preference relay contact 7P0–8, the break contacts 7P1–6, the operated contacts 7P2–5, the operated make busy relay contacts MB–5, the break contacts BYP–3 of the preference busy relay, the break contacts 8FP1–1 of the auxiliary frame preference relay 8FP1, the break contacts 8F–5 of the frame relay 8F, and then through the winding of the pre-empt frame relay 8FP, and then over the BT lead to the marker and the windings of the trunk test relays 3TT, and through the trunk selecting relay contacts TSE1–1 to battery. One of the trunk test marker relays 3TT operates in this circuit and the marker then advances and releases the trunk selecting relays TSE1 and TSE2 and applies a low resistance battery to the BT lead in the usual manner. As a result, the above circuit is transferred from the operated contacts TSE1–2 of the trunk selecting relay to the upper winding of the status check relay 3STOK and the break contacts TSE1–2. The pre-empt frame relay 8FP and the status check relay 3STOK operate in series in this circuit and then the marker advances, pre-empts the selected trunk and establishes a new call over the trunk. When a trunk is pre-empted a lockout signal is transmitted to the pre-empted stations which locks out the line circuits (disconnects them from the network) and returns a pre-empt tone. In thus pre-empting a trunk the marker will establish or store the preference level of the new call on the P0, P1 and P2 relays of the thus pre-empted trunk. The operation of the 3STOK relay indicates to the marker that the status of the call in the pre-empted trunk was the same as the locked-in status on the STL1 through STL5 relays. If a lower level trunk is selected, the STOK relay will not operate, and if the group status did not change as indicated by relay STM being held operated, a trouble condition is indicated. If the STM relay has released, no trouble exists.

A trouble ground or check circuit is provided for the TGA1, TGA2, TGA3 and TGA4 conductors, FIG. 3, through the break contacts 3TG–3, 3TG–4, 3TG–5, and 3TG–6 through the winding of the cross trunk group relay 3XTG1. If trouble ground appears on any of these conductors, cross trunk group relay 3XTG1 operates which in turn causes the marker to advance in a normal manner under trouble conditions.

(6) *Conclusion*

Thus, the status circuit causes those trunks in the trunk group having the lowest preference rating to be conditioned for selection by the marker in substantially the same maner as idle ones of these trunks are conditioned should they be idle, and the marker selects both the trunk link frame and the individual trunks on this frame in substantially the same manner as it selects the various idle trunks of the trunk groups and thereafter establishes the desired calls over the thus-selected and pre-empted trunks.

It is to be understood that the above-described arrangements are illustrative of the application of the principles of our invention. Numerous other arrangements may be devised by those skilled in the art without departing from the spirit and scope of our invention.

Thus, additional levels of preference may be provided by the addition of additional preference relays and circircuits.

Also, the marker may be arranged to search for idle trunks in one or more alternate trunk groups and then go back and re-examine those groups on a pre-emption search or as described above it may be arranged to make an all levels search of a trunk group before advancing to an alternate group.

Furthermore, nonpre-emptible and pre-emptible trunk circuits may be included in the same trunk group.

In addition the specifiic embodiment of our invention described herein is directed to provide multilevel preference and pre-emption of transmission or trunk circuits connected to the trunk link frames. Our invention may be equally well applied to transmission circuits connected to the line link frame.

What is claimed is:

1. In combination in a communication switching system, switching means, control means for controlling said switching means responsive to calls of a plurality of different preference levels, communication paths connected to said switching means, storage means interconnected with said communication paths for storing the preference level of each call employing the respective paths, status means interconnectable with a group of said paths to indicate the lowest preference level stored in said storage means of said group of paths, and means included in said control means and responsive to said status means to select one path of said group of paths.

2. In a communication switching system in combination, switching apparatus, a group of communication paths connected to said switching apparatus, storage means individual to each of said paths to store the preference level of calls in progress over said paths, control means to select said group of paths, and means to select an individual one of said paths characterized in that a status circuit is provided and cooperates with said storage means to indicate a predetermined level of preference of calls in progress over the paths of said group, said means to select an individual one of said paths including control connections with said status circuit and with said storage means for joint control thereby.

3. A communication system in accordance with claim 2 characterized in that said predetermined level of preference of calls indicated by said status circuit is the lowest level of preference of calls in progress over the paths of said group of paths.

4. A communication system in accordance with claim 2 characterized in that said means to select an individual one of said paths includes interconnections jointly controlled by said status circuit and by said storage means to mark for selection all the paths having calls in progress thereover of said predetermined preference level.

5. A communication system in accordance with claim 4 characterized in that said predetermined level of preference of calls indicated by said status circuit and marked for selection is the lowest level of preference of calls in progress over said group of paths.

6. A communication system in accordance with claim 2 characterized in that said means to select an individual one of said paths includes a checking circuit to check the maintenance of said predetermined preference level during the selection of an individual one of said paths.

7. A communication system in accordance with claim 2 characterized in that said means to select an individual one of said paths includes interconnections jointly controlled by said status circuit and by said storage means to mark for selection all the paths having calls in progress thereover having a lower preference level than said predetermined preference level.

8. A communication switching system comprising apparatus responsive to incoming calls of a plurality of different preference levels, a plurality of different groups of transmission paths, storage means individual to each of said paths for storing the preference level of the call in progress thereover, a switching network for selectively establishing paths for said calls to said transmission paths, control means interconnected with said apparatus and with said switching network for selecting one of said groups of transmission paths, selecting means for selecting an individual one of said transmission paths from the selected group of such paths, a status circuit for indicating the lowest level of preference of call in progress over the paths of said selected group, means for interconnecting said status circuit with said storage means of the selected group and with said control means, and comparing means connected to said control means and controlled by said status circuit for comparing the preference level of an incoming call with the said lowest preference level indicated by said status circuit.

9. A communication switching system in accordance with claim 8 characterized in that the control means for selecting one of said groups includes circuits controlled by said comparing means to select and pre-empt one of said transmission paths within said selected group when the preference level of said incoming call is higher than the said lowest preference level indicated by said status circuit.

10. A communication switching system in accordance with claim 8 characterized in that busy indicating means is interconnected with said switching network, and further characterized in that said control means includes circuits for controlling the return of a busy indication from said busy indicating means when the incoming call has a preference level no higher than the preference level indicated by said status circuit.

11. A crossbar switching system comprising in combination, a switching network of crossbar switches, responsive means interconnected with said network responsive to incoming calls of a plurality of different preference levels, a group of transmission paths, preference level storage means individual to each of said paths to store the preference level of a call in progress thereover, control means controlled by an incoming call to select said group of paths, other means for selecting one of said paths of said group comprising a status circuit for indicating the lowest preference level of any call over paths of said group, and interconnections jointly controlled by said status circuit and said storage means for controlling the selection of an individual one of said paths.

12. A crossbar switching system in accordance with claim 11 in which the paths of said group terminate on different frames of said switching network characterized in that marking means are interconnected with said paths and said status circuit for marking for selection frames having paths terminating thereon which paths have calls in progress thereover having the preference level indicated by said status circuit.

13. A crossbar switching system in accordance with claim 11 characterized in that comparing means are interconnected with said control means and with said status circuit for comparing the preference level of an incoming call with the preference level indicated by said status circuit.

14. A crossbar switching system in accordance with claim 12 characterized by additional marking means interconnected with said status circuit and said storage means for marking for selection said paths terminating on a selected one of said frames having calls of the preference level indicated by said status circuit.

15. A crossbar switching system in accordance with claim 12 characterized by additional marking means interconnected with said status circuit and said storage means for marking for selection all of said paths terminating on a selected one of said frames having calls in progress thereover having preference levels lower than the preference level indicated by said status circuit.

16. A crossbar switching system in accordance with claim 14 wherein said control means includes selecting means for selecting and for pre-empting one of said marked paths characterized in that said additional marking means includes checking means for checking that the selected and pre-empted path is one of the marked paths having a call in progress thereover having the preference level indicated by said status circuit.

No references cited.

WILLIAM C. COOPER, *Primary Examiner.*